United States Patent
Kwon (10) Patent No.: US 10,458,787 B2
(45) Date of Patent: Oct. 29, 2019

(54) SYSTEM AND METHOD FOR MEASURING DIRECTION OF FACE OF DRIVER IN VEHICLE

(71) Applicants: HYUNDAI MOTOR COMPANY, Seoul (KR); KIA MOTORS CORPORATION, Seoul (KR)

(72) Inventor: Ik Jae Kwon, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/009,870

(22) Filed: Jun. 15, 2018

(65) Prior Publication Data
US 2019/0186906 A1 Jun. 20, 2019

(30) Foreign Application Priority Data

Dec. 14, 2017 (KR) .................. 10-2017-0172181
Jun. 11, 2018 (KR) .................. 10-2018-0066799

(51) Int. Cl.
- *G01B 11/26* (2006.01)
- *G01B 11/14* (2006.01)
- *B60Q 9/00* (2006.01)

(52) U.S. Cl.
CPC ............. *G01B 11/26* (2013.01); *B60Q 9/00* (2013.01); *G01B 11/14* (2013.01)

(58) Field of Classification Search
CPC .......... G01N 15/1414; G01N 15/0227; G01N 21/532; G01N 21/64; G01N 2015/1402
USPC .................................. 356/432–444
See application file for complete search history.

(56) References Cited

U.S. PATENT DOCUMENTS

2016/0001781 A1* 1/2016 Fung ............... B60W 40/08
701/36

FOREIGN PATENT DOCUMENTS

KR 2011-0123284 A 11/2011

* cited by examiner

*Primary Examiner* — Tri T Ton
(74) *Attorney, Agent, or Firm* — Morgan, Lewis & Bockius LLP (57) ABSTRACT

A system for measuring a direction of the face of a driver in a vehicle includes a sensor system for measuring a distance between a headrest in the vehicle and the face of the driver, and a controller communicatively connected to the sensor system and configured to collect the measured distance for a predetermined period of time, calculate an average distance between the headrest and the face of the driver by using the collected distance, and compare the calculated average distance and a current distance between the headrest and the face of the driver to determine the direction of the face of the driver in the vehicle.

18 Claims, 9 Drawing Sheets

SYSTEM AND METHOD FOR MEASURING DIRECTION OF FACE OF DRIVER IN VEHICLE

CROSS-REFERENCE TO RELATED APPLICATION

This application is based on and claims the benefit of priority to Korean Patent Application No. 10-2017-0172181, filed on Dec. 14, 2017 and 10-2018-0066799 filed on Jun. 11, 2018 in the Korean Intellectual Property Office, the disclosure of which is incorporated herein in its entirety by reference.

TECHNICAL FIELD

The present disclosure relates to a system and a method for measuring a direction of the face of a driver in a vehicle, and more particularly to a technology of measuring a direction of the face of a driver in a vehicle and providing a notification service.

BACKGROUND

Conventionally, a headrest adjusting apparatus may include a capacitive sensor that detects a location of the head of a passenger with a detection electrode disposed on a contact surface of a head part of a headrest in a noncontact manner to adjust the forward/rearward position of the headrest to a proper position without causing a unpleasant feeling to the passenger, and adjust the forward/rearward position of the headrest based on an output (detection result) of the capacitive sensor.

The headrest adjusting apparatus may include a capacitive sensor that detects a distance between a headrest and a head, a headrest driving motor that drives the headrest to become closer to or far away from the head, and a controller that controls driving of the headrest driving motor based on the output of the capacitive sensor and adjust the headrest to a proper position such that the distance between the headrest and the head may be constant.

The headrest adjusting apparatus may include a capacitive sensor that detects a location of the head of a passenger (sitter) with a detection electrode disposed on a contact surface of a head part of a headrest in a noncontact manner to allow the upward/downward position of the headrest to accurately correspond to the location of the head of the passenger, and adjust the upward/downward position of the headrest based on an output (detection result) of the capacitive sensor.

SUMMARY

The present disclosure provides a system for measuring a direction of the face of a driver in a vehicle, which may measure a direction of the face of the driver in the vehicle, may display a driving warning phase at a point that coincides with a gaze direction of the driver according to the determined direction of the face of the driver, and may not provide an unnecessary alarm optionally, and a method thereof.

The technical objects of the present disclosure are not limited to the above-mentioned one, and the other unmentioned technical objects will become apparent to those skilled in the art from the following description.

In accordance with an aspect of the present disclosure, a system for measuring a direction of the face of a driver in a vehicle includes a sensor system for measuring a distance between a headrest in the vehicle and the face of the driver, and a controller communicatively connected to the sensor system and configured to collect the measured distance for a predetermined period of time, calculate an average distance between the headrest and the face of the driver by using the collected distance, and compare the calculated average distance and a current distance between the headrest and the face of the driver to determine the direction of the face of the driver in the vehicle.

According to an embodiment, the sensor system may include a plurality of distance measuring sensors that use infrared rays or laser.

According to an embodiment, the sensor system may include a first sensor provided at a left upper end of the headrest, a second sensor provided at a right upper end of the headrest, a third sensor provided at a left lower end of the headrest, and a fourth sensor provided at a right lower end of the headrest.

According to an embodiment, the controller may display a driving warning phase or displays an emergency message at a point that coincides with a gaze direction of the driver by determining the direction of the face of the driver.

According to an embodiment, the controller may determine that the direction of the face of the driver faces the upper side when the current distance between the first sensor or the second sensor of the headrest and the face of the driver is smaller than the calculated average distance, and may determine that the direction of the face of the driver faces to the left side when the current distance between the first sensor or the third sensor of the headrest and the face of the driver is smaller than the calculated average distance.

According to an embodiment, the controller may determine that the direction of the face of the driver faces the upper side when the current distance between the first sensor or the second sensor of the headrest and the face of the driver is smaller than the calculated average distance, and may determine that the direction of the face of the driver faces to the right side when the current distance between the second sensor or the fourth sensor of the headrest and the face of the driver is smaller than the calculated average distance.

According to an embodiment, the controller may determine that the direction of the face of the driver faces the upper side when the current distance between the first sensor or the second sensor of the headrest and the face of the driver is smaller than the calculated average distance, and may determine that the direction of the face of the driver faces to the front side when the current distance between the third sensor or the fourth sensor of the headrest and the face of the driver is substantially equal to the calculated average distance.

According to an embodiment, the controller may determine that the direction of the face of the driver faces the lower side when the current distance between the first sensor or the second sensor of the headrest and the face of the driver is larger than the calculated average distance, and may determine that the direction of the face of the driver faces to the left side when the current distance between the first sensor or the third sensor of the headrest and the face of the driver is smaller than the calculated average distance.

According to an embodiment, the controller may determine that the direction of the face of the driver faces the lower side when the current distance between the first sensor or the second sensor of the headrest and the face of the driver is larger than the calculated average distance, and may determine that the direction of the face of the driver faces to the right side when the current distance between the second sensor or the fourth sensor of the headrest and the face of the driver is smaller than the calculated average distance.

According to an embodiment, the controller may determine that the direction of the face of the driver faces the lower side when the current distance between the first sensor or the second sensor of the headrest and the face of the driver is larger than the calculated average distance, and may determine that the direction of the face of the driver faces to the front side when the current distance between the third sensor or the fourth sensor of the headrest and the face of the driver is substantially equal to the calculated average distance.

According to an embodiment, the controller may determine that the direction of the face of the driver faces the front side when the current distance between the first sensor or the second sensor of the headrest and the face of the driver is substantially equal to the calculated average distance, and may determine that the direction of the face of the driver faces to the left side when the current distance between the first sensor or the third sensor of the headrest and the face of the driver is smaller than the calculated average distance.

According to an embodiment, the controller may determine that the direction of the face of the driver faces the front side when the current distance between the first sensor or the second sensor of the headrest and the face of the driver is substantially equal to the calculated average distance, and may determine that the direction of the face of the driver faces to the right side when the current distance between the second sensor or the fourth sensor of the headrest and the face of the driver is smaller than the calculated average distance.

According to an embodiment, the controller may determine that the direction of the face of the driver faces the front side when the current distance between the first sensor or the second sensor of the headrest and the face of the driver is substantially equal to the calculated average distance, and may determine that the direction of the face of the driver faces to the front side when the current distance between the third sensor or the fourth sensor of the headrest and the face of the driver is substantially equal to the calculated average distance.

In accordance with another aspect of the present disclosure, there is provided a method for measuring a direction of the face of a driver in a vehicle, the method including measuring a distance between a headrest in the vehicle and the face of the driver, collecting the measured distance for a predetermined period of time, calculating an average distance between the headrest and the face of the driver by using the collected distance, and comparing the calculated average distance and a current distance between the headrest and the face of the driver to determine the direction of the face of the driver.

In an embodiment, the determining of the direction of the face of the driver in the vehicle may include determining that the direction of the face of the driver faces the upper side when the current distance between the first sensor or the second sensor of the headrest and the face of the driver is smaller than the calculated average distance, and determining that the direction of the face of the driver faces to the left side when the current distance between the first sensor or the third sensor of the headrest and the face of the driver is smaller than the calculated average distance.

In an embodiment, the determining of the direction of the face of the driver in the vehicle may include determining that the direction of the face of the driver faces the upper side when the current distance between the first sensor or the second sensor of the headrest and the face of the driver is smaller than the calculated average distance, and determining that the direction of the face of the driver faces to the right side when the current distance between the second sensor or the fourth sensor of the headrest and the face of the driver is smaller than the calculated average distance.

In an embodiment, the determining of the direction of the face of the driver in the vehicle may include determining that the direction of the face of the driver faces the upper side when the current distance between the first sensor or the second sensor of the headrest and the face of the driver is smaller than the calculated average distance, and determining that the direction of the face of the driver faces to the front side when the current distance between the third sensor or the fourth sensor of the headrest and the face of the driver is substantially equal to the calculated average distance.

In an embodiment, the determining of the direction of the face of the driver in the vehicle may include determining that the direction of the face of the driver faces the lower side when the current distance between the first sensor or the second sensor of the headrest and the face of the driver is larger than the calculated average distance, and determining that the direction of the face of the driver faces to the left side when the current distance between the first sensor or the third sensor of the headrest and the face of the driver is smaller than the calculated average distance.

In an embodiment, the determining of the direction of the face of the driver in the vehicle may include determining that the direction of the face of the driver faces the lower side when the current distance between the first sensor or the second sensor of the headrest and the face of the driver is larger than the calculated average distance, and determining that the direction of the face of the driver faces to the right side when the current distance between the second sensor or the fourth sensor of the headrest and the face of the driver is smaller than the calculated average distance.

In an embodiment, the determining of the direction of the face of the driver in the vehicle may include determining that the direction of the face of the driver faces the lower side when the current distance between the first sensor or the second sensor of the headrest and the face of the driver is larger than the calculated average distance, and determining that the direction of the face of the driver faces to the front side when the current distance between the third sensor or the fourth sensor of the headrest and the face of the driver is substantially equal to the calculated average distance.

In an embodiment, the determining of the direction of the face of the driver in the vehicle may include determining that the direction of the face of the driver faces the front side when the current distance between the first sensor or the second sensor of the headrest and the face of the driver is substantially equal to the calculated average distance, and determining that the direction of the face of the driver faces to the left side when the current distance between the first sensor or the third sensor of the headrest and the face of the driver is smaller than the calculated average distance.

In an embodiment, the determining of the direction of the face of the driver in the vehicle may include determining that the direction of the face of the driver faces the front side when the current distance between the first sensor or the second sensor of the headrest and the face of the driver is substantially equal to the calculated average distance, and determining that the direction of the face of the driver faces to the right side when the current distance between the second sensor or the fourth sensor of the headrest and the face of the driver is smaller than the calculated average distance.

In an embodiment, the determining of the direction of the face of the driver in the vehicle may include determining that the direction of the face of the driver faces the front side when the current distance between the first sensor or the second sensor of the headrest and the face of the driver is substantially equal to the calculated average distance, and determining that the direction of the face of the driver faces to the front side when the current distance between the third sensor or the fourth sensor of the headrest and the face of the driver is substantially equal to the calculated average distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Figure 1:
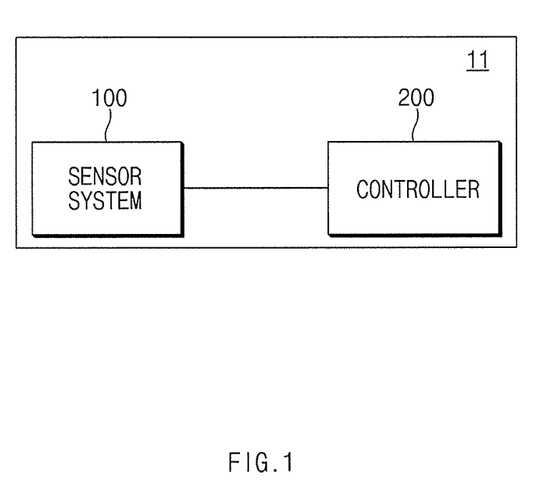
FIG. 1 is a diagram illustrating a system for measuring a direction of the face of a driver in a vehicle according to an embodiment of the present disclosure.

FIG. 1 is a diagram illustrating a system for measuring a direction of the face of a driver in a vehicle according to an embodiment of the present disclosure.

Referring to FIG. 1, a system 11 for measuring a direction of the face of a driver in a vehicle includes a headrest 10, and the headrest 10 includes a sensor system 100 and a controller 200 communicatively connected to the sensor system 100. The controller 200 is an electric circuitry that executes instructions of software which thereby performs various functions described hereinafter.

The sensor system 100 includes a plurality of distance measuring sensors, and may include a first sensor 1 provided at a left upper end of the headrest 10, a second sensor 2 provided at a right upper end of the headrest 10, a third sensor provided at a left lower end of the headrest 10, and a fourth sensor 4 provided at a right lower end of the headrest 10, which is a simple example for helping understanding of the present disclosure, and the present disclosure is not limited thereto.

For example, two sensors may be provided on the left and right sides of the headrest 10, one for each side, respectively, to measure a distance between the headrest 10 and the face 20 of the driver, and two sensors may be provided on the upper and lower sides of the headrest 10, one for each side, respectively.

The sensor system 100 measures a distance between the headrest 10 and the face 20 of the driver by using a plurality of distance measuring sensors that uses infrared rays or laser.

For example, the sensor system 100 may measure a distance (d1) between a measurement point (a measurement point on the left side) of the first sensor 1 of the headrest 10 and a measurement point (a point including a linear distance from the first sensor 1 to the face 20 of the driver) of the face of the driver by using infrared rays or laser of the plurality of distance measuring sensors, and may measure a distance (d2) between a measurement point (a measurement point on the right side) of the second sensor 2 of the headrest 10 and a measurement point (a point including a linear distance from the second sensor 2 to the face 20 of the driver) of the face of the driver.

For example, the sensor system 100 may measure a distance (d1) between a measurement point (a measurement point at the left upper end) of the first sensor 1 of the headrest 10 and a measurement point (a point including a linear distance from the first sensor 1 to the face 20 of the driver) of the face of the driver by using infrared rays or laser of the plurality of distance measuring sensors, and may measure a distance (d3) between a measurement point (a measurement point at the left lower end) of the third sensor 3 of the headrest 10 and a measurement point (a point including a linear distance from the third sensor 3 to the face 20 of the driver) of the face of the driver.

For example, the sensor system 100 may measure a distance (d3) between a measurement point (a measurement point on the left side) of the third sensor 3 of the headrest 10 and a measurement point (a point including a linear distance from the third sensor 3 to the face 20 of the driver) of the face of the driver of the face of the driver by using infrared rays or laser of the plurality of distance measuring sensors, and may measure a distance (d4) between a measurement point (a measurement point on the right side) of the fourth sensor 4 of the headrest 10 and a measurement point (a point including a linear distance from the fourth sensor 4 to the face 20 of the driver) of the face of the driver.

For example, the sensor system 100 may measure a distance (d2) between a measurement point (a measurement point on the right upper end) of the second sensor 2 of the headrest and a measurement point (a point including a linear distance from the second sensor 2 to the face 20 of the driver) of the face of the driver by using infrared rays or laser of the plurality of distance measuring sensors, and may measure a distance (d4) between a measurement point (a measurement point on the right lower end) of the fourth sensor 4 of the headrest and a measurement point (a point including a linear distance from the fourth sensor 4 to the face 20 of the driver) of the face of the driver.

The controller 200 may collect the measured distance between the headrest 10 and the face 20 of the driver for a predetermined period of time (a specific period of time), and calculate an average distance (an average value of the posture of the driver) of the face of the driver between the headrest and the face 20 of the driver by using the collected distance.

For example, the controller 200 may collect the measured distance between the headrest 10 and the face 20 of the driver for a predetermined period of time (for example, 5 minutes), and then may calculate an average distance (an average value of the posture of the driver) between the headrest 10 and the driver by using the collected distance.

For example, in order to calculate an average distance (an average value of the posture of the driver) between the headrest 10 and the driver, the controller 200 may calculate average distances by measuring the linear distances between the headrest 10 and the face 20 of the driver, from the first sensor 1, the second sensor 2, the third sensor 3, and the fourth sensor 4 in the headrest 10.

The controller 200 may store the calculated average distance for a predetermined period of time (a specific period of time) corresponding to a sitting height or a sitting posture of the driver in a seat in the vehicle. For example, because the driver and other drivers have different sitting heights or sitting postures when the driver or the other drivers drives the vehicle, the controller 200 may calculate an average distance corresponding to specific periods of time corresponding to various sitting heights or sitting postures.

The controller 200 may compare the currently measured distance between the headrest 10 and the face 20 of the driver and may determine the direction of the face 20 of the driver in the vehicle. Here, a method for comparing the currently measured distance between the headrest 10 and the face 20 of the driver and determining the direction of the face 20 of the driver in the vehicle by the controller 200 will be described in detail with reference to FIG. 5.

After determining the direction of the face 20 in the vehicle, the controller 200 may display a driving warning phase or an emergency message at a point that coincides with a gaze direction of the driver according to the determined direction of the face 20 of the driver, and may not provide an unnecessary message or an unnecessary alarm optionally.

Figure 2A:
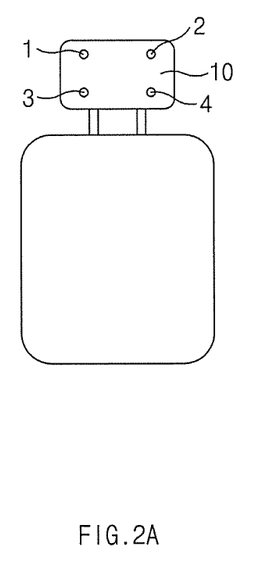
FIGS. 2A and 2B are views illustrating a method for measuring a direction of the face of a driver in a vehicle according to an embodiment of the present disclosure.
Figure 2B:
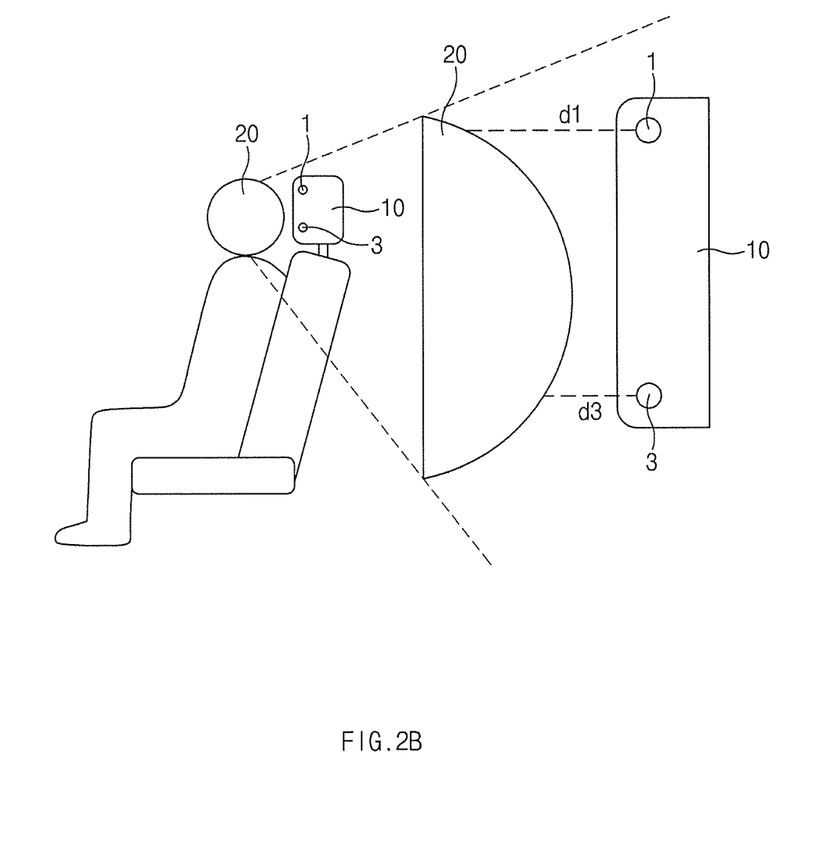

FIGS. 2A to 2C are views illustrating a method for measuring a direction of the face 20 of a driver in a vehicle according to an embodiment of the present disclosure, in which FIG. 2A is a front view and FIG. 2B is a side view.

Referring to FIGS. 2A and 2B, the sensor system 100 of the system 11 for measuring a direction of the face 20 of a driver in a vehicle may measure a distance between the headrest 10 and the face 20 of the driver by using infrared rays or laser.

The sensor system 100 may include a first sensor 1 at a left upper end of the headrest 10, a second sensor 2 provided at a right upper end of the headrest 10, a third sensor 3 provided at a left lower end of the headrest 10, and a fourth sensor 4 provided at a right lower end of the headrest 10.

The controller 200 may compare the measured distances between the first sensor 1 and the third sensor 3 (or the second sensor 2 and the fourth sensor 4) of the head rest 10 and the face 20 of the driver or the measured distances between the first sensor 1 and the second sensor 2 (or the third sensor 3 and the fourth sensor 4) of the head rest 10 and the face 20 of the driver and the calculated average distance between the headrest 10 and the face 20 of the driver to determine whether the driver gazes at the front side, the left side, the right side, the upper side, or the lower side.

Figure 3A:
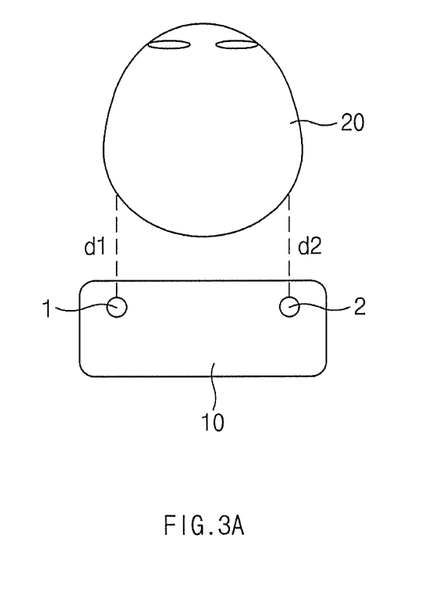
FIGS. 3A to 3C are views illustrating a method for measuring a direction of the face of a driver in a vehicle when the driver changes the direction of the face leftwards or rightwards according to an embodiment of the present disclosure.
Figure 3B:
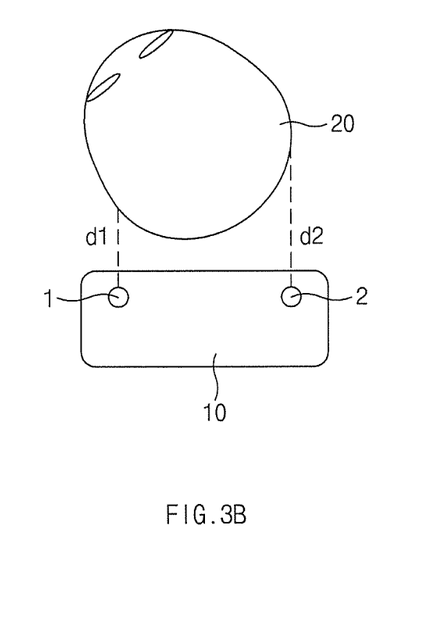
Figure 3C:
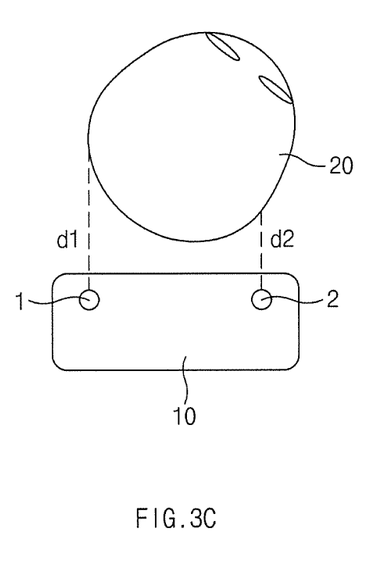

FIGS. 3A to 3C are views illustrating a method for measuring a direction of the face 20 of a driver in a vehicle when the driver changes the direction of the face 20 leftwards or rightwards according to an embodiment of the present disclosure.

Referring to FIGS. 3A, 3B, and 3C, the system 11 for measuring a direction of the face 20 of a driver in a vehicle compares a distance (an average distance between the headrest and the face 20 of the driver) between the headrest 10 and the face 20 of the driver when the driver gazes at the front side and a distance between the face 20 and the headrest 10 when the driver gazes at the left or right sides when the direction of the face 20 of the driver is changed to the left or right side to measure the direction of the face 20 of the driver.

Referring to FIG. 3A, when the driver gazes at the front side, a linear distance between the face 20 of the driver and the first sensor 1 of the headrest 10 may be defined as a left distance (d1), and a linear distance between the face 20 of the driver and the second sensor 2 of the headrest 10 may be defined as a right distance (d2).

Referring to FIG. 3B, the left distance (d1) between the headrest 10 and the face 20 of the driver when the driver gazes at the left side may be shorter than the left distance (d1) of FIG. 3A between the headrest 10 and the face 20 of the driver when the driver gazes at the front side.

Referring to FIG. 3B, the right distance (d2) between the headrest 10 and the face 20 of the driver when the driver gazes at the left side may be longer than the right distance (d2) of FIG. 3A between the headrest 10 and the face 20 of the driver when the driver gazes at the front side.

Referring to FIG. 3C, the left distance (d1) between the headrest 10 and the face 20 of the driver when the driver gazes at the right side may be longer than the left distance (d1) of FIG. 3A between the headrest 10 and the face 20 of the driver when the driver gazes at the front side.

Referring to FIG. 3C, the right distance (d2) between the headrest 10 and the face 20 of the driver when the driver gazes at the right side may be shorter than the right distance (d2) of FIG. 3A between the headrest 10 and the face 20 of the driver when the driver gazes at the front side.

Figure 4A:
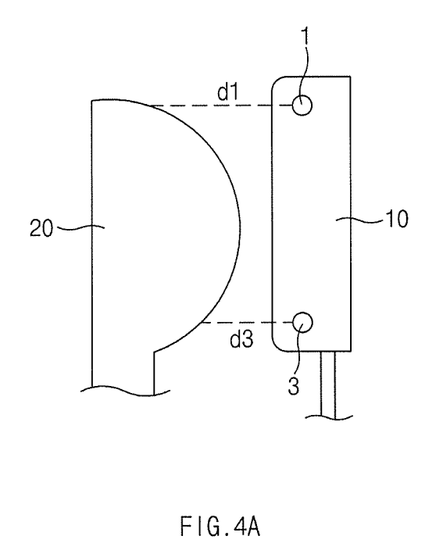
FIGS. 4A to 4C are views illustrating a method for measuring a direction of the face of a driver in a vehicle when the driver changes the direction of the face upwards or downwards according to an embodiment of the present disclosure.
Figure 4B:
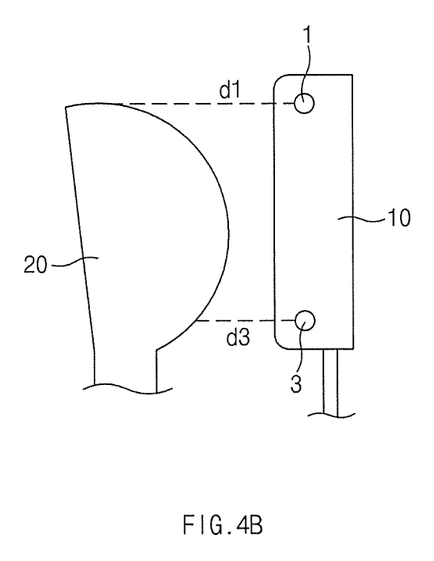
Figure 4C:
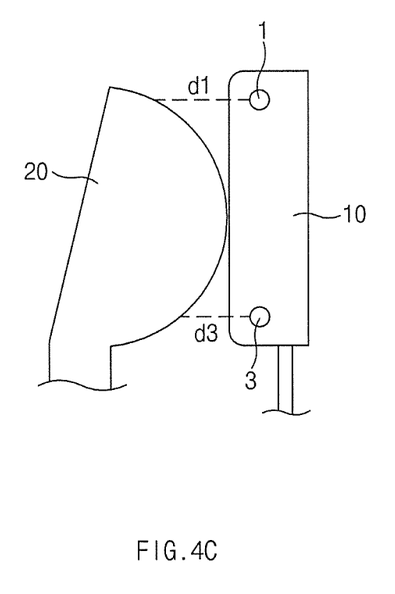

FIGS. 4A to 4C are views illustrating a method for measuring a direction of a face in a vehicle when the driver changes the direction of the face 20 upwards or downwards according to an embodiment of the present disclosure.

Referring to FIGS. 4A, 4B, and 4C, the system 11 for measuring a direction of a face 20 in a vehicle compares a distance between the face 20 of the driver and the headrest 10 when the driver gazes at the front side and a distance between the face 20 and the headrest 10 when the driver gazes at the upper or lower sides when the direction of the face 20 of the driver is changed to the upper or lower side to measure the direction of the face 20.

Referring to FIG. 4A, a linear distance between the face 20 of the driver and the first sensor 1 of the headrest 10 may be defined as an upper distance, and a linear distance between the face 20 of the driver and the third sensor 3 of the headrest 10 may be defined as a lower distance.

Referring to FIG. 4B, the upper distance (d1) between the headrest 10 and the face 20 of the driver when the driver gazes at the lower side may be longer than the upper distance (d1) of FIG. 4A between the headrest 10 and the face 20 of the driver when the driver gazes at the front side.

Referring to FIG. 4B, the lower distance (d3) between the headrest 10 and the face 20 of the driver when the driver gazes at the lower side may be longer than the lower distance (d3) of FIG. 4A between the headrest 10 and the face 20 of the driver when the driver gazes at the front side.

Referring to FIG. 4C, the upper distance (d1) between the headrest 10 and the face 20 of the driver when the driver gazes at the upper side may be shorter than the upper distance (d1) between the headrest 10 and the face 20 of the driver when the driver gazes at the front side.

Referring to FIG. 4C, the lower distance (d3) between the headrest 10 and the face 20 of the driver when the driver gazes at the upper side may be shorter than the lower distance (d3) between the headrest 10 and the face 20 of the driver when the driver gazes at the front side.

Figure 5:
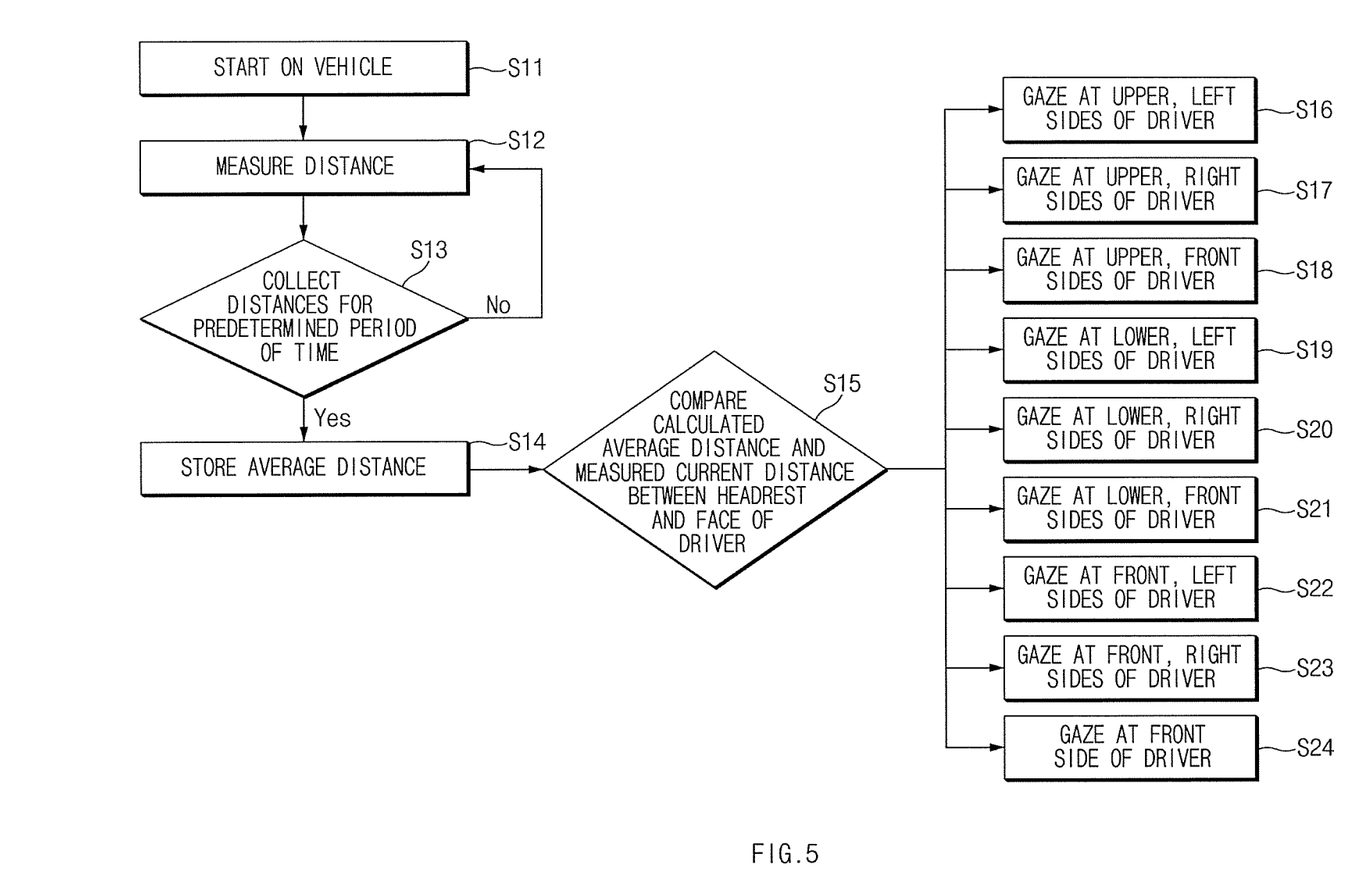
FIG. 5 is a flowchart illustrating a method for measuring a direction of the face of a driver in a vehicle according to an embodiment of the present disclosure.

FIG. 5 is a flowchart illustrating a method for measuring a direction of the face 20 of a driver in a vehicle according to an embodiment of the present disclosure.

Referring to FIG. 5, operations S11 to S24 of the method for measuring a direction of the face 20 of a driver in a vehicle according to an embodiment of the present disclosure will be described with reference to FIG. 1.

In operations S11 and S12, when the vehicle is started on, the sensor system 100 of the system 11 for measuring a direction of the face 20 of the driver measures a distance between the headrest 10 and the face 20 of the driver by using infrared rays or laser of the plurality of distance measuring sensors.

For example, the sensor system 100 may measure a distance between the first sensor 1 of the headrest 10 and the face 20 of the driver (or a distance between the third sensor 3 and the face 20 of the driver) and a distance between the second sensor 2 and the face 20 of the driver (or a distance between the fourth sensor 4 and the face 20 of the driver) by using infrared rays or laser of the plurality of distance measuring sensors.

For example, the sensor system 100 may measure a distance between the first sensor 1 of the headrest 10 and the face 20 of the driver (or a distance between the second sensor 2 and the face 20 of the driver) and a distance between the third sensor 3 and the face 20 of the driver (or a distance between the fourth sensor 4 and the face 20 of the driver) by using infrared rays or laser of the plurality of distance measuring sensors.

In operation S13, the controller 200 may collect the distances measured by the sensors for a predetermined period of time (a specific period of time), and calculate an average distance (an average value of the posture of the driver) between the headrest 10 and the driver by using the collected distance.

For example, the controller 200 may collect the distances measured by the sensors for five minutes, and then may calculate an average distance (an average value of the posture of the driver) between the headrest 10 and the driver by using the collected distance.

In operation S14, the controller 200 may store the calculated average distance for a predetermined period of time (a specific period of time) corresponding to a sitting height or a sitting posture of the driver in a seat in the vehicle.

In operation S15, the controller 200 may compare the calculated average distance (or the distance between the headrest 10 and the face 20 of the driver when the driver gazes at the front side) and the measured current distance between the headrest 10 and the face 20 of the driver. That is, the measured current distance between the headrest 10 and the face of the driver may be a changing distance value.

In operation S16, the controller 200 determines that the direction of the face 20 of the driver faces the upper side, when the current distance between the first sensor 1 (or the second sensor 2) of the headrest 10 and the face 20 of the driver is smaller than the calculated average distance. The controller 200 determines that the direction of the face 20 of the driver faces the left side, when the current distance between the first sensor 1 (or the third sensor 3) of the headrest 10 and the face 20 of the driver is smaller than the calculated average distance.

In operation S17, the controller 200 determines that the direction of the face 20 of the driver faces the upper side, when the current distance between the first sensor 1 (or the second sensor 2) of the headrest 10 and the face 20 of the driver is smaller than the calculated average distance. The controller 200 determines that the direction of the face 20 of the driver faces the right side, when the current distance between the second sensor 2 (or the fourth sensor 4) of the headrest 10 and the face 20 of the driver is smaller than the calculated average distance.

In operation S18, the controller 200 determines that the direction of the face 20 of the driver faces the upper side, when the current distance between the first sensor 1 (or the second sensor 2) of the headrest 10 and the face 20 of the driver is smaller than the calculated average distance. The controller 200 determines that the direction of the face 20 of the driver faces the front side, when the current distance between the third sensor 3 (or the fourth sensor 4 of the headrest 10 and the face 20 of the driver is substantially equal to the calculated average distance.

In operation S19, the controller 200 determines that the direction of the face 20 of the driver faces the lower side, when the current distance between the first sensor 1 (or the second sensor 2) of the headrest 10 and the face 20 of the driver is larger than the calculated average distance. The controller 200 determines that the direction of the face 20 of the driver faces the left side, when the current distance between the first sensor 1 (or the third sensor 3) of the headrest 10 and the face 20 of the driver is smaller than the calculated average distance.

In operation S20, the controller 200 determines that the direction of the face 20 of the driver faces the lower side, when the current distance between the first sensor 1 (or the second sensor 2) of the headrest 10 and the face 20 of the driver is larger than the calculated average distance. The controller 200 determines that the direction of the face 20 of the driver faces the right side, when the current distance between the second sensor 2 (or the fourth sensor 4) of the headrest 10 and the face 20 of the driver is smaller than the calculated average distance.

In operation S21, the controller 200 determines that the direction of the face 20 of the driver faces the lower side, when the current distance between the first sensor 1 (or the second sensor 2) of the headrest 10 and the face 20 of the driver is larger than the calculated average distance. The controller 200 determines that the direction of the face 20 of the driver faces the front side, when the current distance between the third sensor 3 (or the fourth sensor 4) of the headrest 10 and the face 20 of the driver is substantially equal to the calculated average distance.

In operation S22, the controller 200 determines that the direction of the face 20 of the driver faces the front side, when the current distance between the first sensor 1 (or the second sensor 2) of the headrest 10 and the face 20 of the driver is substantially equal to the calculated average distance. The controller 200 determines that the direction of the face 20 of the driver faces the left side, when the current distance between the first sensor 1 (or the third sensor 3) of the headrest 10 and the face 20 of the driver is smaller than the calculated average distance.

In operation S23, the controller 200 determines that the direction of the face 20 of the driver faces the front side, when the current distance between the first sensor 1 (or the second sensor 2) of the headrest 10 and the face 20 of the driver is substantially equal to the calculated average distance. The controller 200 determines that the direction of the face 20 of the driver faces the right side, when the current distance between the second sensor 2 (or the fourth sensor 4) of the headrest 10 and the face 20 of the driver is smaller than the calculated average distance.

In operation S24, the controller 200 determines that the direction of the face 20 of the driver faces the front side, when the current distance between the first sensor 1 (or the second sensor 2) of the headrest 10 and the face 20 of the driver is substantially equal to the calculated average distance. The controller 200 determines that the direction of the face 20 of the driver faces the front side, when the current distance between the third sensor 3 (or the fourth sensor 4) of the headrest 10 and the face 20 of the driver is substantially equal to the calculated average distance.

Thereafter, after determining the direction of the face in the vehicle, the controller 200 of the system 11 for measuring a direction of the face 20 of a driver in a vehicle may display a driving warning phase or an emergency message at a point that coincides with a gaze direction of the driver according to the determined direction of the face 20 of the driver. The controller 200 may not provide an unnecessary message or an unnecessary alarm optionally.

Figure 6:
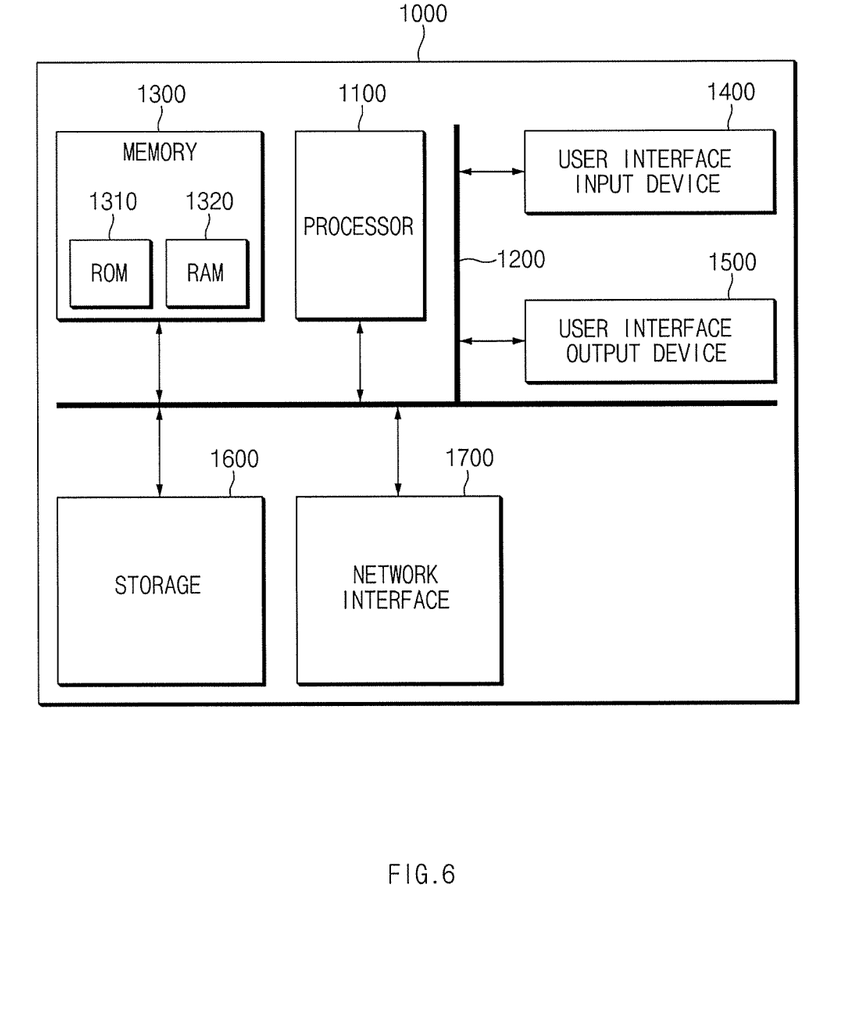
FIG. 6 is a view illustrating a computing system that executes a method for measuring a direction of the face of a driver in a vehicle according to an embodiment of the present disclosure.

FIG. 6 is a view illustrating a computing system that executes a method for measuring a direction of a face in a vehicle according to an embodiment of the present disclosure.

Referring to FIG. 6, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present disclosure may measure a distance between a headrest provided in a vehicle and the face of a driver, and may be determine a direction of the face of the driver corresponding to the distance.

Further, the present disclosure may display a driving warning phase or an emergency message at a point that coincides with a gaze direction of the driver according to the determined direction of the face of the driver, and may not provide an unnecessary message or an unnecessary alarm optionally.

What is claimed is:

1. A system for measuring a direction of a face of a driver in a vehicle, the system comprising:
 a sensor system for measuring a distance between a headrest in the vehicle and the face of the driver; and
 a controller communicatively connected to the sensor system the controller configured to:
  collect the measured distance for a predetermined period of time,
  calculate an average distance between the headrest and the face of the driver by using the collected distance, and
  compare the calculated average distance and a current distance between the headrest and the face of the driver to determine the direction of the face of the driver in the vehicle,
 wherein the sensor system includes:
  a first sensor disposed at a left upper end of the headrest;
  a second sensor disposed at a right upper end of the headrest;
  a third sensor disposed at a left lower end of the headrest; and
  a fourth sensor disposed at a right lower end of the headrest.

2. The system of claim 1, wherein the sensor system further includes:
 a plurality of distance measuring sensors that use infrared rays or laser.

3. The system of claim 1, wherein the controller displays a driving warning phase or displays an emergency message at a point that coincides with a gaze direction of the driver by determining the direction of the face of the driver.

4. The system of claim 1, wherein the controller determines that the direction of the face of the driver faces an upper side when the current distance between the first sensor or the second sensor of the headrest and the face of the driver is smaller than the calculated average distance, and
 the controller determines that the direction of the face of the driver faces to a left side when the current distance between the first sensor or the third sensor of the headrest and the face of the driver is smaller than the calculated average distance.

5. The system of claim 1, wherein the controller determines that the direction of the face of the driver faces an upper side when the current distance between the first sensor or the second sensor of the headrest and the face of the driver is smaller than the calculated average distance, and the controller determines that the direction of the face of the driver faces to a right side when the current distance between the second sensor or the fourth sensor of the headrest and the face of the driver is smaller than the calculated average distance.

6. The system of claim 1, wherein the controller determines that the direction of the face of the driver faces an upper side when the current distance between the first sensor or the second sensor of the headrest and the face of the driver is smaller than the calculated average distance, and the controller determines that the direction of the face of the driver faces to the front side when the current distance between the third sensor or the fourth sensor of the headrest and the face of the driver is substantially equal to the calculated average distance.

7. The system of claim 1, wherein the controller determines that the direction of the face of the driver faces a lower side when the current distance between the first sensor or the second sensor of the headrest and the face of the driver is larger than the calculated average distance, and the controller determines that the direction of the face of the driver faces to a left side when the current distance between the first sensor or the third sensor of the headrest and the face of the driver is smaller than the calculated average distance.

8. The system of claim 1, wherein the controller determines that the direction of the face of the driver faces a lower side when the current distance between the first sensor or the second sensor of the headrest and the face of the driver is larger than the calculated average distance, and the controller determines that the direction of the face of the driver faces to a right side when the current distance between the second sensor or the fourth sensor of the headrest and the face of the driver is smaller than the calculated average distance.

9. The system of claim 1, wherein the controller determines that the direction of the face of the driver faces a lower side when the current distance between the first sensor or the second sensor of the headrest and the face of the driver is larger than the calculated average distance, and the controller determines that the direction of the face of the driver faces to the front side when the current distance between the third sensor or the fourth sensor of the headrest and the face of the driver is substantially equal to the calculated average distance.

10. The system of claim 1, wherein the controller determines that the direction of the face of the driver faces the front side when the current distance between the first sensor or the second sensor of the headrest and the face of the driver is substantially equal to the calculated average distance, and the controller determines that the direction of the face of the driver faces to a left side when the current distance between the first sensor or the third sensor of the headrest and the face of the driver is smaller than the calculated average distance.

11. The system of claim 1, wherein the controller determines that the direction of the face of the driver faces the front side when the current distance between the first sensor or the second sensor of the headrest and the face of the driver is substantially equal to the calculated average distance, and the controller determines that the direction of the face of the driver faces to a right side when the current distance between the second sensor or the fourth sensor of the headrest and the face of the driver is smaller than the calculated average distance.

12. The system of claim 1, wherein the controller determines that the direction of the face of the driver faces the front side when the current distance between the first sensor or the second sensor of the headrest and the face of the driver is substantially equal to the calculated average distance, and the controller determines that the direction of the face of the driver faces to the front side when the current distance between the third sensor or the fourth sensor of the headrest and the face of the driver is substantially equal to the calculated average distance.

13. A method for measuring a direction of a face of a driver in a vehicle, the method comprising:

measuring, by a sensor system, a distance between a headrest in the vehicle and the face of the driver;

collecting, by a controller, the measured distance for a predetermined period of time;

calculating, by the controller, an average distance between the headrest and the face of the driver by using the collected distance; and comparing, by the controller, the calculated average distance and a current distance between the headrest and the face of the driver to determine the direction of the face of the driver, wherein the sensor system includes:

a first sensor disposed at a left upper end of the headrest;

a second sensor disposed at a right upper end of the headrest;

a third sensor disposed at a left lower end of the headrest; and a fourth sensor disposed at a right lower end of the headrest.

14. The method of claim 13, wherein the determining of the direction of the face of the driver in the vehicle includes:

determining that the direction of the face of the driver faces an, upper side when the current distance between the first sensor or the second sensor of the headrest and the face of the driver is smaller than the calculated average distance; and determining that the direction of the face of the driver faces a left side when the current distance between the first sensor or the third sensor of the headrest and the face of the driver is smaller than the calculated average distance.

15. The method of claim 13, wherein the determining of the direction of the face of the driver in the vehicle includes:

determining that the direction of the face of the driver faces an upper side when the current distance between the first sensor or the second sensor of the headrest and the face of the driver is smaller than the calculated average distance; and determining that the direction of the face of the driver faces Rthefla right side when the current distance between the second sensor or the fourth sensor of the headrest and the face of the driver is smaller than, the calculated average distance.

16. The method of claim 13, wherein the determining of the direction of the face of the driver in the vehicle includes:

determining that the direction of the face of the driver faces an upper side when the current distance between the first sensor or the second sensor of the headrest and the face of the driver is smaller than the calculated average distance; and determining that the direction of the face of the driver faces the front side when the current distance between the third sensor or the fourth sensor of the headrest and the face of the driver is substantially equal to the calculated average distance.

17. The method of claim 13, wherein the determining of the direction of the face of the driver in the vehicle includes:
- determining that the direction of the face of the driver faces a lower side when the current distance between the first sensor or the second sensor of the headrest and the face of the driver is larger than the calculated average distance; and
- determining that the direction of the face of the driver faces a left side when the current distance between the first sensor or the third sensor of the headrest and the face of the driver is smaller than the calculated average distance.

18. The method of claim 13, wherein the determining of the direction of the face of the driver in the vehicle includes:
- determining that the direction of the face of the driver faces a lower side when the current distance between the first sensor or the second sensor of the headrest and the face of the driver is larger than the calculated average distance; and
- determining that the direction of the face of the driver faces a right side when the current distance between the second sensor or the fourth sensor of the headrest and the face of the driver is smaller than the calculated average distance.

* * * * *